United States Patent
Horstmeyer et al.

(10) Patent No.: US 10,601,851 B2
(45) Date of Patent: Mar. 24, 2020

(54) DETECTING CYBER-ATTACKS WITH SONIFICATION

(71) Applicant: Cisco Technology, Inc., San Jose, CA (US)

(72) Inventors: Neal Sean Horstmeyer, Cumming, GA (US); Diana Bess Horn, Roswell, GA (US); Shirish Shanbhag, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 15/893,973

(22) Filed: Feb. 12, 2018

(65) Prior Publication Data
US 2019/0253441 A1 Aug. 15, 2019

(51) Int. Cl.
| | | |
|---|---|---|
| H04L 29/06 | (2006.01) | |
| G10L 25/51 | (2013.01) | |
| G06N 20/00 | (2019.01) | |

(52) U.S. Cl.
CPC ......... *H04L 63/1425* (2013.01); *G06N 20/00* (2019.01); *G10L 25/51* (2013.01); *H04L 63/1441* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 6,381,341 B1 * | 4/2002 | Rhoads | G06K 9/00442 382/100 |
| 6,400,996 B1 * | 6/2002 | Hoffberg | G05B 19/0426 370/218 |
| 8,583,263 B2 * | 11/2013 | Hoffberg | G05B 15/02 700/17 |
| 9,025,779 B2 | 5/2015 | Ramalho et al. | |
| 9,967,173 B2 * | 5/2018 | Gross | H04L 45/126 |
| 10,291,334 B2 * | 5/2019 | Henry | H04B 17/0085 |
| 2005/0097179 A1 * | 5/2005 | Orme | H04L 51/12 709/207 |

(Continued)

OTHER PUBLICATIONS

Shan, Dan et al. Detecting Multi-Channel Wireless Microphone User Emulation Attacks in White Space with Noise. 8th International Conference on Cognitive Radio Oriented Wireless Networks. https://ieeexplore.ieee.org/stamp/stamp.jsp?tp=&arnumber=6636810 (Year: 2013).*

(Continued)

*Primary Examiner* — Jeremiah L Avery
(74) *Attorney, Agent, or Firm* — Edell, Shapiro & Finnan, LLC

(57) ABSTRACT

Presented herein are techniques for detecting cyber-attacks with sonification. A method includes obtaining, at a network security analysis device, a set of features extracted from one or more network traffic flows between a given host in a network and a domain. The set of features are converted to an acoustical waveform representative of the set of features. Audio patterns are detected in the acoustical waveform using acoustical fingerprints and a cyber-attack is identified in the network by identifying an anomalous sequence of the audio patterns.

20 Claims, 9 Drawing Sheets

(56) References Cited

U.S. PATENT DOCUMENTS

2016/0234356 A1* 8/2016 Thomas ............... H05K 9/0069
2018/0188704 A1* 7/2018 Cella .................... G05B 19/418

OTHER PUBLICATIONS

Kirbiz, Serap et al. Forensic Watermarking During AAC Playback. 2007 IEEE International Conference on Multimedia and Expo. https://ieeexplore.ieee.org/stamp/stamp.jsp?tp=&arnumber=4284849 (Year: 2007).*

Kune, Denis Foo et al. Ghost Talk: Mitigating EMI Signal Injection Attacks against Analog Sensors. 2013 IEEE Symposium on Security and Privacy. https://ieeexplore.ieee.org/stamp/stamp.jsp?tp=&arnumber=6547107 (Year: 2013).*

Lie, Wen-Nung; Chang, Li-Chun. Robust and High-Quality Time-Domain Audio Watermarking Based on Low-Frequency Amplitude Modification. IEEE Transactions on Multimedia, vol. 8, Issue: 1. https://ieeexplore.ieee.org/stamp/stamp.jsp?tp=&arnumber=1580525 (Year: 2006).*

Namin, et al., "The Sounds of Cyber Threats", Jun. 22, 2014, 5 pgs.

Vickers, et al., "Sonification Aesthetics and Listening for Network Situational Awareness", SoniHED—Conference on Sonification of Health and Environmental Data, Sep. 12, 2014, 6 pgs.

Axon, et al., "Reflecting on the Use of Sonification for Network Monitoring", SECURWARE 2016: The Tenth International Conference on Emerging Security Information, Systems and Technologies, ISBN: 978-1-61208-493-0, IARIA, Jul. 24-28, 2016, 8 pgs.

Ballora, et al., "Songs of cyberspace: an update on sonifications of network traffic to support situational awareness", Multisensor, Multisource Information Fusion: Architechtures, Algorithms, and Applications 2011, Proc. of SPIE vol. 8064, 80640P-1, doi: 10.1117/12.883443, Jun. 7, 2011, 6 pgs.

M. Gilfix and A. Couch, "Peep (the network auralizer): Monitoring your network with sound." in Proceedings of the Large Installation System Administration Conference, 2000, pp. 109-117.

P. Vickers, C. Laing, and T. Fairfax, "Sonification of a network's self-organized criticality," arXiv preprint arXiv:1407.4705, 2014.

M. Garcia-Ruiz, M. Vargas Martin, B. Kapralos, J. Tashiro, and R. Acosta-Diaz, "Best practices for applying sonification to support teaching and learning of network intrusion detection," in Proceedings of the World Conference on Educational Multimedia, Hypermedia and Telecommunications, 2010, pp. 752-757.

S. El Seoud, M. Garcia-Ruiz, A. Edwards, R. Aquino-Santos, and M. Martin, "Auditory display as a tool for teaching network intrusion detection," International Journal of Emerging Technologies in Learning (iJET), vol. 3, No. 2, 2008, pp. 59-62.

Axon, et al., "A Formalised Approach to Designing Sonification Systems for Network-Security Monitoring," International Journal on Advances in Security, vol. 10, No. 1 and 2, Jul. 2017, 22 pages.

Worrall, "Realtime Sonification and Visualisation of Network Metadata (The NetSon Project)," The 21st International Conference on Auditory Display (ICAD 2015), Jul. 2015, 3 pages.

* cited by examiner

DETECTING CYBER-ATTACKS WITH SONIFICATION

TECHNICAL FIELD

The present disclosure relates to network security.

BACKGROUND

New cyber-attacks are generated on nearly a daily basis. For example, variants of ransomware and other malicious software are appearing nearly every day. Consequently, it is becoming increasingly difficult to keep computer networks current with the security attack landscape, especially since computer networks are becoming increasingly complex and intertwined in day-to-day activities. There are a growing number of interfaces and systems that vary in terminology, visual representations, and interactions.

Tracking and preventing cyber-attacks, such as viruses and malware, in a computer network is becoming increasingly challenging. To combat this, an increasing amount of data is being added to network traffic data or created in view of network traffic data in an attempt to provide insight into network activities. However, as a result, early warning signs of an attack are often missed or overlooked because security services are overwhelmed by the increasing types of cyber-attacks and amount of network information available.

DESCRIPTION OF EXAMPLE EMBODIMENTS

Overview

Figure 1:
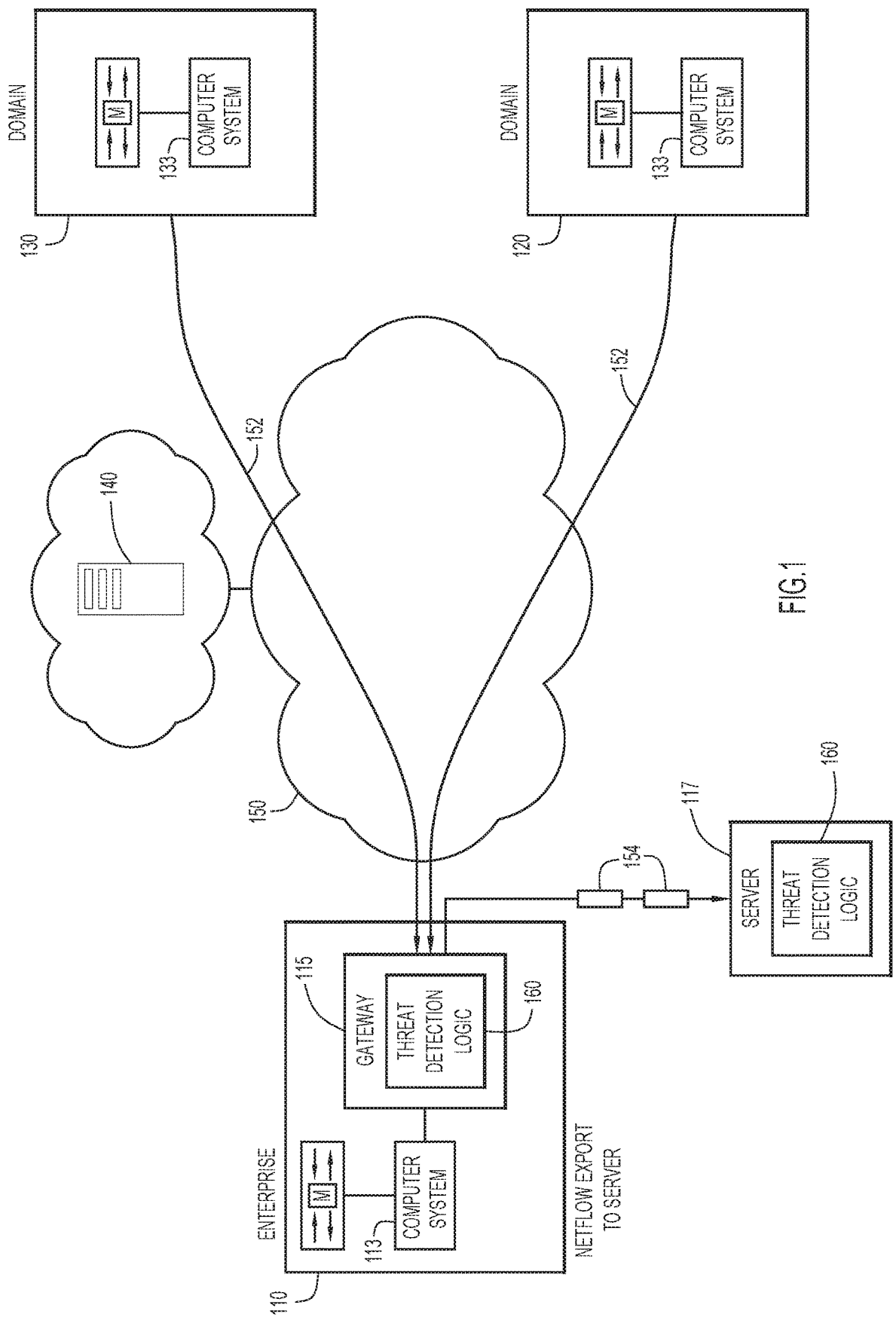
FIG. 1 illustrates an example computer network environment in which the techniques presented herein may be employed, according to an example embodiment.

Presented herein are techniques for detecting cyber-attacks using data sonification. These techniques may be embodied as a method, an apparatus, a system, and executable instructions in a computer-readable storage media to perform the method, and may be used, for example, to train various classifiers.

According to one example embodiment, a method includes obtaining, at a network security analysis device, a set of features extracted from one or more network traffic flows between a given host in a network and a domain. The set of features are converted to an acoustical waveform representative of the set of features. Audio patterns are detected in the acoustical waveform using acoustical fingerprints and a cyber-attack is identified in the network by identifying an anomalous sequence of the audio patterns.

Example Embodiments

The techniques presented herein involve generating an acoustical waveform that is representative of features of network traffic flowing between two hosts (i.e., domains or endpoints). That is, the techniques presented herein utilize sonification techniques to transform complex features of network traffic flows between two hosts, which are typically represented by a discrete value or a set of values over time, into an acoustical waveform that can be analyzed to identify cyber-attacks. More specifically, the techniques presented herein generate feature-specific acoustical waveforms for select features of the network traffic flowing between two hosts and combine these feature-specific acoustical waveforms into a single acoustical waveform for analysis based on acoustical fingerprints. The analysis may identify various patterns or sequences (i.e., patterns of patterns) of acoustical fingerprints relating to multiple features in order to detect cyber-attacks or in general, any network security risk in the network traffic.

Moreover, since in at least some embodiments, the techniques presented herein need only to analyze a single acoustical waveform that represents features over time, the techniques can utilize digital analysis techniques that are often unavailable for analyzing voluminous amounts of largely numerically-based data of the features. For example, machine learning techniques (e.g., time-based learnings from recurrent neural networks and long short-term memory models with convolutional neural networks) can be applied to the features to allow for ingesting the dynamic behaviors and time-based aspects of network traffic data. This allows for deeper learning of the host-to-host communication patterns and optimizes learning from multiple features, so that a network security analysis device implementing the techniques presented herein can identify and respond to cyber-attacks in real-time. The security analysis device may also dynamically learn and detect acoustical anomalies representative of the attacks. In at least some embodiments, the techniques presented herein are also continually and dynamically updated, during training and run-time, via machine learning techniques. Ultimately, this responsive learning provides a network security analysis device with an expanded knowledge-base of cyber security anomalies through faster detection alongside increased effective working memory from dual-modality presentation. Consequently, the techniques provided herein provide a distinct improvement in network security or monitoring techniques utilizing sonification.

When non-sonified network traffic features (e.g., discrete or numerical values) are analyzed, features often need to be analyzed individually or transformed into complex vectors. That is, the dynamic nature of the cyber-attack landscape often forces analysts to utilize monitoring tools with rich sensory capabilities and knowledge of cyber-attacks before the cyber-attacks can be identified. Without complex tools, it is incredibly difficult to sort through the vast amounts of data generated by the myriad features of network traffic. By sonifying the features (i.e., by transforming largely numerically-based features into acoustical waveforms), multiple acoustical waveforms can be easily combined (i.e., overlaid onto each other) and can be quickly and efficiently analyzed digitally as a single acoustical waveform. Moreover, digitally analyzing acoustical waveforms allows for a fine-tuned detection of patterns, especially as compared to sonification techniques that simply produce audio output and rely on a human to detect anomalies in the audio output, which are often quite subtle or even undetectable by the human ear.

Reference is first made to FIG. 1 for a description of a network environment 100 in which the techniques presented herein may be employed, according to at least one example embodiment. FIG. 1 shows a computer network 110 (i.e., an enterprise network) and external domains 120, 130. Domains 120, 130, may be devices such as, as servers (e.g., web servers, and the like) with which computers within the computer network 110 communicate. The computer system 113 in computer network 110 may initiate communication with, e.g., computer system 123 of domain 120 through a gateway or proxy device 115 that is connected to the Internet 150. There is also a computer system 133 in domain 130.

A central server computer 117 is shown that has connectivity to the network 110. Network traffic 152 is shown flowing between the computer network 110 and the external domains 120, 130. Network traffic 152 may also be provided to the central server computer 117 in the form of packet flows 154.

In an example of a network threat incident, computer system 140, also connected to Internet 150, may be a source of a network attack. As a specific example, computer system 140 may be configured to spoof domains 120 and 130. That being said, those skilled in the art will appreciate that domains 120 and 130 may, themselves, be a source of a network attack, which may have been able to penetrate computer network 110 (as represented by malware "M"). Thus, the packet flows from computer system 123 (or 140) to enterprise computer system 113 may contain malicious network attack packets (i.e., the traffic may include a cyber-attack).

In at least some embodiments, the gateway device 115 may include threat detection logic 160 that is configured to sonify features of network traffic and detect a cyber-attack based on patterns (i.e., acoustical fingerprints) within the sonified features of the telemetry data. In these embodiments, as the traffic 152 is received by gateway device 115, the threat detection logic 160 may analyze features extracted from the traffic 152 using the techniques described herein. In some instances, the threat detection logic 160 extracts the features in accordance with feature extraction techniques now known or developed hereafter, but in other instances, the threat detection logic 160 receives features once the features are extracted from the network traffic 152.

Additionally or alternatively, the threat detection logic 160 (or a portion thereof) may be hosted in a separate computer system such as the central server computer 117. In this configuration, the threat detection logic 160 may import packet flow log data or files ("logs") and/or features extracted from the network traffic 152. Alternatively, the threat detection logic 160 can receive packet flows 154 directly from the network 110. The data may include extracted features or network traffic data that allows the threat detection logic 160 to extract features. As mentioned above, the threat detection logic 160 may obtain features in accordance with any feature extraction techniques now known or developed hereafter.

In some instances, features that may be extracted from a network traffic flow include: a timestamp of the network traffic flow; a source/destination host Internet Protocol (IP) subnet of a traffic flow; a source/destination host port of a traffic flow; numbers of bytes and packets transferred in a traffic flow; and the specific type of IP utilized by a traffic flow (such as TCP, user datagram protocol (UDP), etc.). Additionally or alternatively, records including these features may be stitched and de-duplicated to build an entire conversation between two hosts. The resultant records may be enhanced with additional data points derived from other sources, including: source/destination host groups of traffic flows (host groups are a manual classification of a hosts based on function, location etc.); an application associated with traffic flows (e.g. an online conference application, such as the WebEx® online conference service application by Cisco, a remote desktop application, a peer-to-peer streaming application, etc.); a service associated with traffic flows (e.g., a Domain Name Service (DNS), a Simple Mail Transfer Protocol (SMTP) service, a Simple Network Management Protocol (SNMP) service, or a File Transfer Protocol (FTP) service, etc.).

Figure 2:
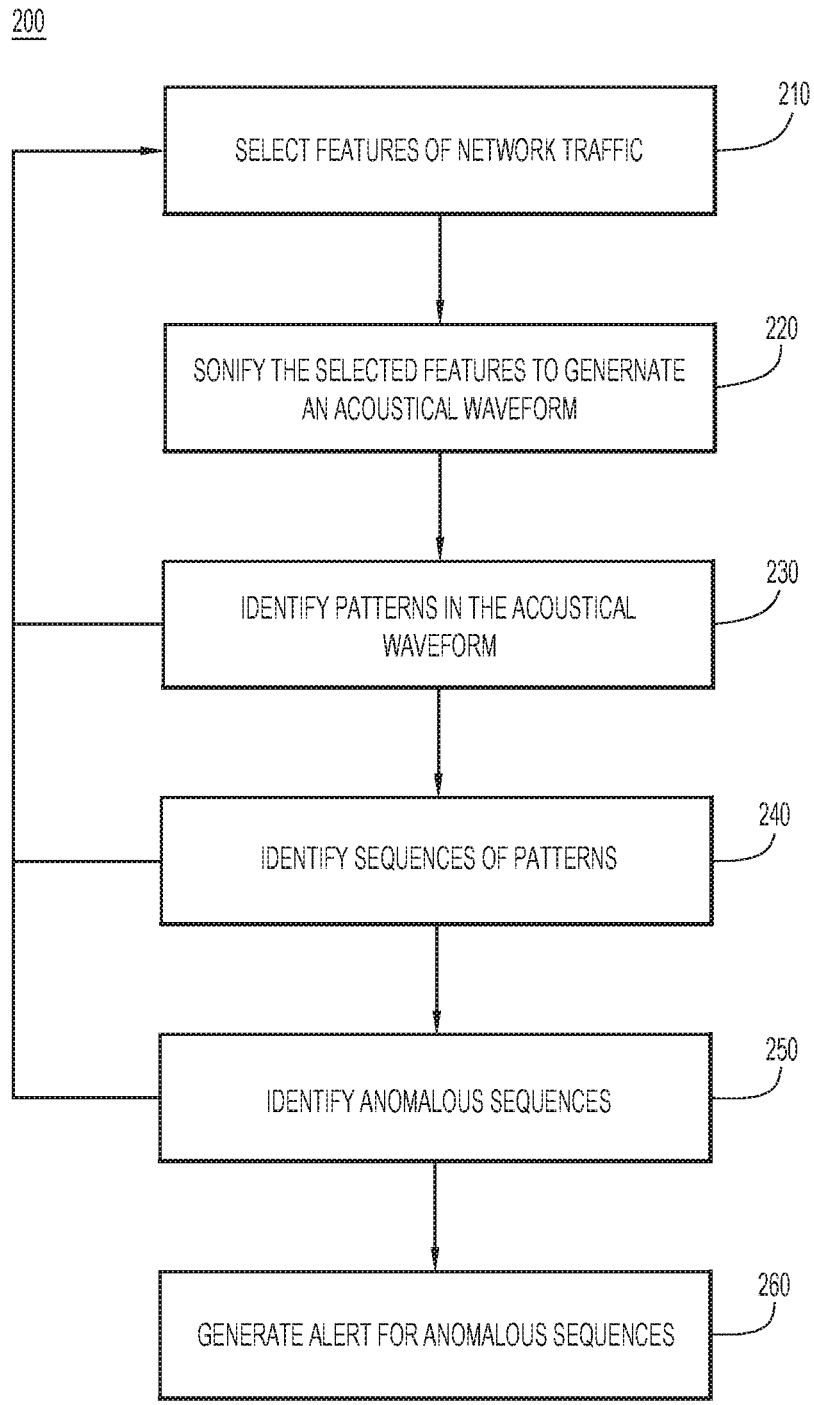
FIG. 2 is a flowchart of a method for detecting cyber-attacks with sonification, according to an example embodiment.

Referring next to FIG. 2 a flowchart is shown of a method 200 that includes operations performed by one or more security analysis devices to detect cyber-attacks using data sonification. Initially, at 210, one or more features of network traffic are selected for analysis. For example, if the features extracted from the network traffic include byte/packet rate of network traffic flows, applications associated with the network traffic flows, services associated with the network traffic flows, average packet size of the network traffic flows, transmission control protocol (TCP) flags included in the network traffic flows, and duration of the network traffic flows, one or more of these features may be selected at 210 for purposes of data sonification analysis. As a more specific example, byte/packet rate, application, and average packet size may be selected for analysis. Each of these features provide data about the conversation between two hosts.

At 220, the selected features are sonified. That is, numerical and discrete values of each feature, over time, are transformed into an acoustical waveform. The sonification operation builds a representation that brings key (i.e. selected) features (if not all) together in time. In at least some embodiments, each of the features selected for analysis at 210 is initially sonified individually. Then, the acoustical waveforms generated during the per-feature sonification are combined to generate an acoustical waveform representative of all of the features selected for analysis. However, different features may be sonified with slightly different sonification techniques. For example, features with discrete values (i.e., values that are constant over time and not necessarily numerical), such as source/destination IP address, source/destination IP port, IP type, TCP flags, source/destination host group, application, and service, may be transformed into a first type of acoustical wave. Meanwhile, features with numerical values that can change over time (i.e., features that are continually changing), such as timestamps, number of bytes and packets transferred, average packet size, byte/packet rate, ratio of bytes sent to bytes received, and duration of the conversation, may be transformed into a second type of acoustical wave.

At 230, one or more patterns are identified in the single acoustical wave (i.e., the waveform generated by sonifying the selected features and combining the feature-specific acoustical waves). That is, the one or more security analysis devices may "listen" to the single acoustical wave and identify acoustical fingerprints (i.e., auditory patterns). Digitally processing the acoustical waveforms automates the security process and allows an analyst to passively monitor a network for cyber-attacks. That is, when an acoustical waveform is digitally processed, an analyst can perform other tasks without having to monitor visual or audio data.

Regardless of how the "listening" occurs, the techniques presented herein may dynamically learn acoustical fingerprints. For example, in at least some embodiments, the techniques employ unsupervised machine learning techniques to identify patterns in the acoustical waveform. In essence, this pattern identification builds a vocabulary for a "conversation" between two hosts (i.e., for the network traffic flows between two hosts). As compared to human conversations, conversations between two machines are much more precise and unambiguous. For example, there is a pattern in the way a certificate is negotiated at the beginning of a conversation on a Secure Sockets Layer (SSL) connection and there is also a pattern in the rate at which data is transferred while watching streaming a movie. Thus, once features like application or service are determined for a particular conversation, then the traffic between the two hosts should follow a certain pattern.

In view of the connection between the features and the patterns, in at least some embodiments, the features will be adjusted (i.e., tweaked) in view of the pattern detection, as is shown by the feedback between operations 230 and 210, to ensure that a sufficient number of patterns (not to high, but not too low) are collected and/or identified. That is, the techniques involve learning, over time, combinations of features that result or should result in certain patterns and may continually and dynamically adjust the feature selection at 210 based on these combinations. Notably, since many machine learning techniques focus on searching in an n-dimensional feature space, adding time as a dimension makes the search more complicated. However, this increased complication is offset (i.e., counterbalanced) by the relative simplicity of the acoustical waveform. That is, the acoustical waveform simplifies the pattern detection enough for machine learning techniques to detect patterns, even over time. That being said, in at least some embodiments, there may still be a learning phase for the machine learning techniques that involves ingesting sonified conversation between hosts on a network for period of time to build a stable set of patterns.

At step 240, the identified patterns are analyzed to identify sequences of patterns (i.e., patterns of patterns). For example, if a conversation between two hosts identifies patterns A, B, and C, the order of the identified patterns over time may then be analyzed to identify sequences. That is, the patterns are analyzed over time to identify sequences. At 250, anomalous sequences are identified and at 260 an alarm is generated for anomalous sequences. The identification of sequences and anomalous sequences are described in further detail below in connection with FIGS. 4-8. However, generally, anomalous sequences can be detected by comparing sequences (such as sequences the same conversation, sequences from conversations with similar patterns, or sequences from conversations involving the same host) over time. As a brief example, if patterns A, B, and C are found in the following order: ABCABCABCABCABCCCC, the sequence ABC may be identified as a regular sequence and the sequence CCC included at the end of the timeline may be an anomalous sequence. Machine learning techniques may also be utilized to identify sequences and to identify anomalous sequences. Consequently, in at least some embodiments, the sequence identification and/or the anomalous sequence identification performed at 240 and 250, respectively, may be provide feedback to the feature selection at 210.

Figure 3:
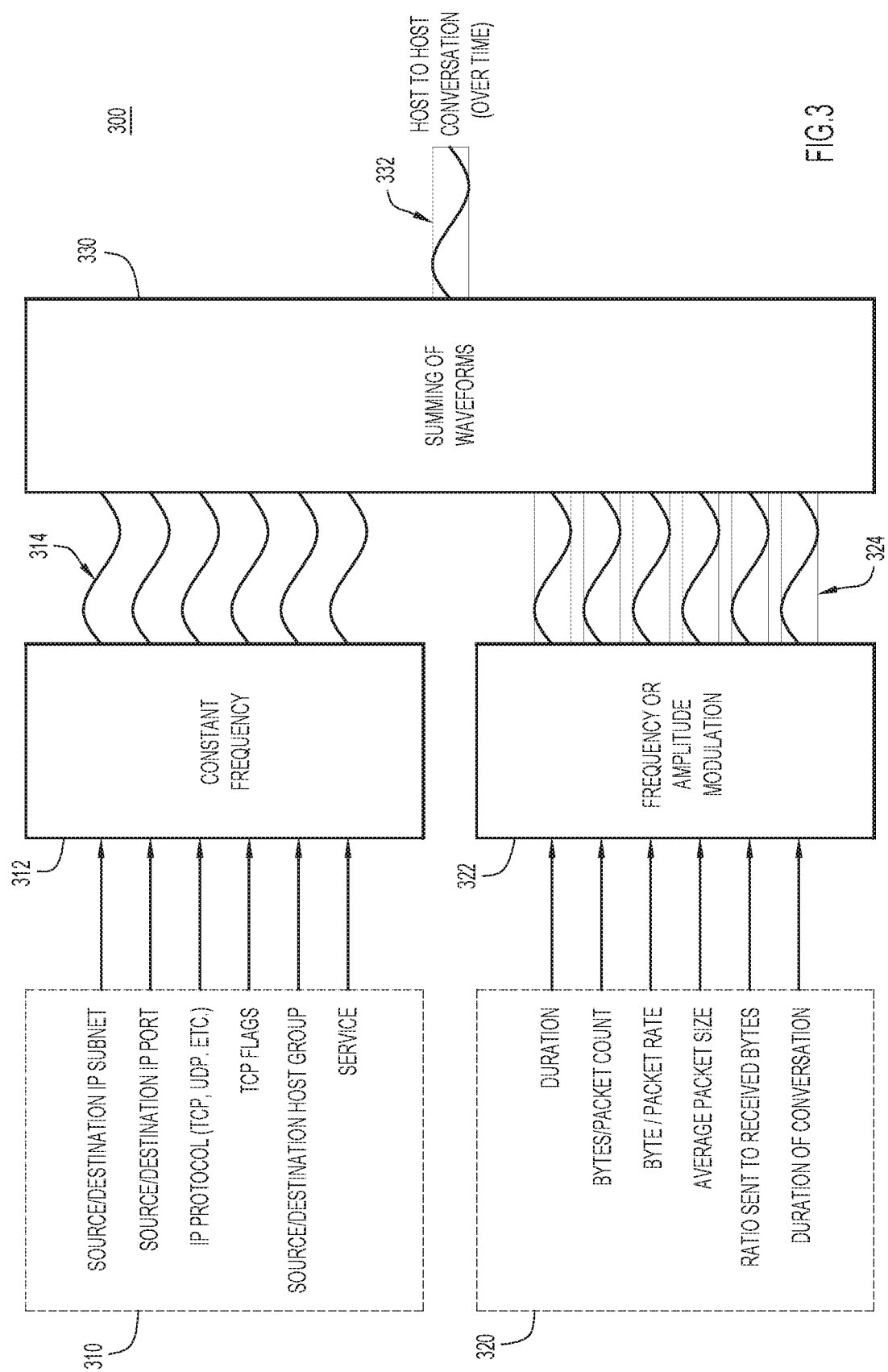
FIG. 3 is a diagram depicting a process for sonification of features of network traffic, according to an example embodiment.

Turning now to FIG. 3, a diagram 300 is shown that depicts the sonification operation performed at step 220 of FIG. 2. As shown at 310 and 320, initially, features may be sorted based on whether they are discrete or continuous. In FIG. 3, the features shown at 310 (i.e., source/destination IP subnet, source/destination IP Port (e.g., 80, 443, etc.), protocol (such as TCP, user datagram protocol (UDP), etc.), TCP flags, Source/Destination Host Group, and Service) have a constant or relatively constant value over time, and, thus, are discrete. To sonify these features, each feature is assigned a waveform with a unique frequency at 312. This generates a number of relatively uniform waveforms 314. Meanwhile, the features shown at 320 (i.e., duration, byte/packet count, byte/packet rate, average packet size, ratio of sent to received bytes, duration of conversation, etc.) are continuous features that have values that changes or varies over time. Thus, in sonifying these varying features at 322, the features are each assigned a waveform with a unique frequency, but the frequency is modulated over time based on the changing value, to produce waveforms 324 that vary over time.

At 330, the constant waveforms 314 and varying waveforms 324 are combined to generate a single acoustical waveform 332 representative of the analyzed features. That is, the single acoustical waveform 332 represents select features of a conversation between two hosts over time. In at least some embodiments, the feature-specific waveforms (i.e., constant waveforms 314 and varying waveforms 324) are combined by summing the feature-specific waveforms together (i.e., overlaying the feature-specific waveforms).

Figure 4:
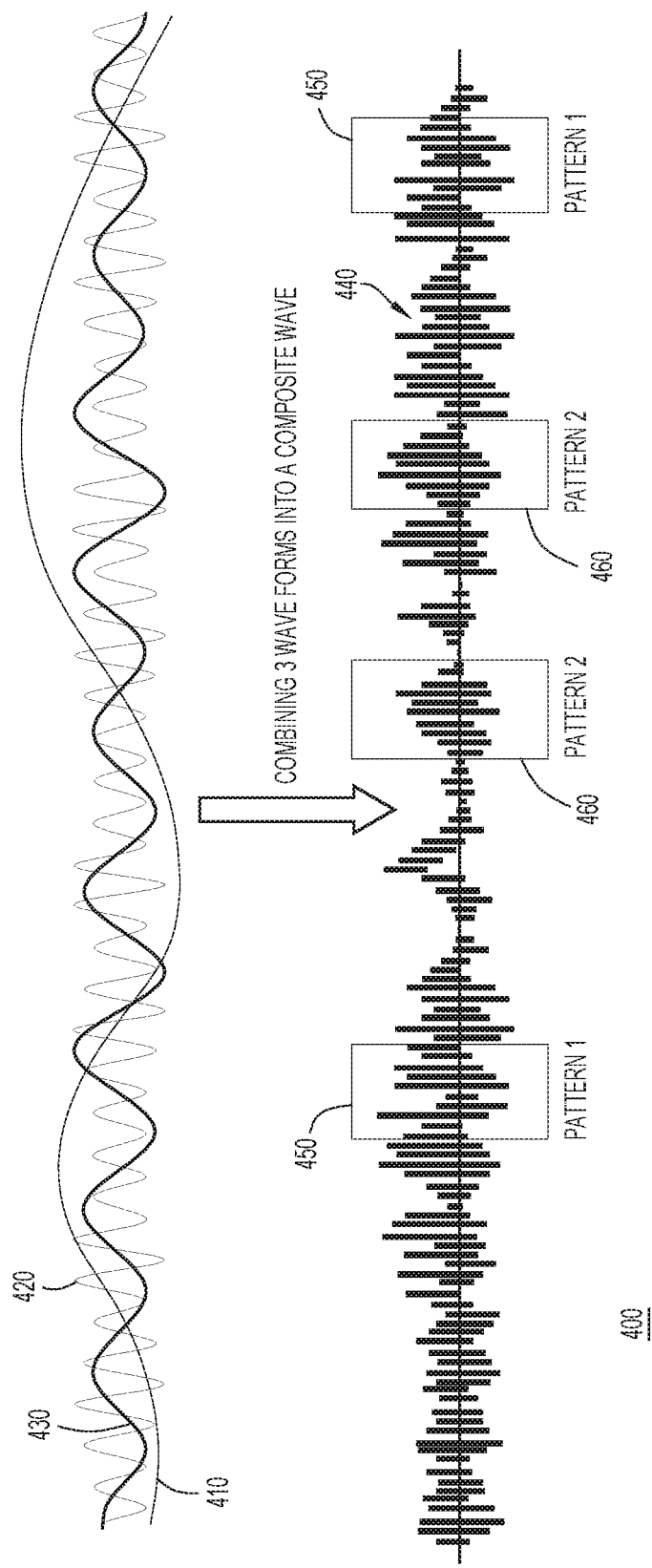
FIG. 4 is a diagram depicting a sonification of features of network traffic, according to an example embodiment.

Reference is now made to the diagram 400 depicted in FIG. 4. Diagram 400 illustrates three feature-specific waveforms (waveform 410, waveform 420, and waveform 430) being combined into a single or composite acoustical waveform 440 (e.g., corresponding to acoustical waveform 332 of FIG. 3). Waveform 410 is representative of the application feature (and, thus, has a uniform frequency), waveform 420 is representative of a byte/packet rate feature (and, thus, has a frequency that is modulated over time), and waveform 430 is representative of an average packet size feature (and, thus, has a frequency that is modulated over time). However, once the composite waveform 440 is created, these waveforms are not specifically identifiable within the composite waveform 440; instead, an analysis of the composite waveform 440 may identify patterns that are representative of the specific combination of features represented in feature-specific waves 410, 420, and 430 over time.

For example, first pieces 450 and second pieces 460 of the composite waveform 440 may be identified as patterns because these pieces are seen repeatedly in previously analyzed composite waveforms (i.e., previous conversations) and/or because similar patterns have been fed to threat detection logic (e.g., threat detection logic 160 from FIG. 1) during a training phase (e.g., based on known information and/or to simulate a cyber-attack). As a more specific example, machine learning techniques may be applied to the composite waveform 440 to identify patterns included therein (i.e., the composite waveform serves as a dataset within which patterns can be identified) based on repetition and/or previous training. However, the number of patterns identified in a composite waveform 440 may differ in different embodiments and/or over time. For example, in some embodiments, only a certain number of patterns may identified over a specific length of the composite waveform 4440. Additionally or alternatively, the number of identified patterns may depend on the number of feature-specific waveforms that were combined to generate the composite waveform 440. Still further, in some embodiments, the number of identified patterns may vary over time (e.g., machine learning techniques may adjust the number of patterns to identify over time while also adjusting the features selected to generate the feature-specific waveforms being used to generate the composite waveform 440).

Figure 5:
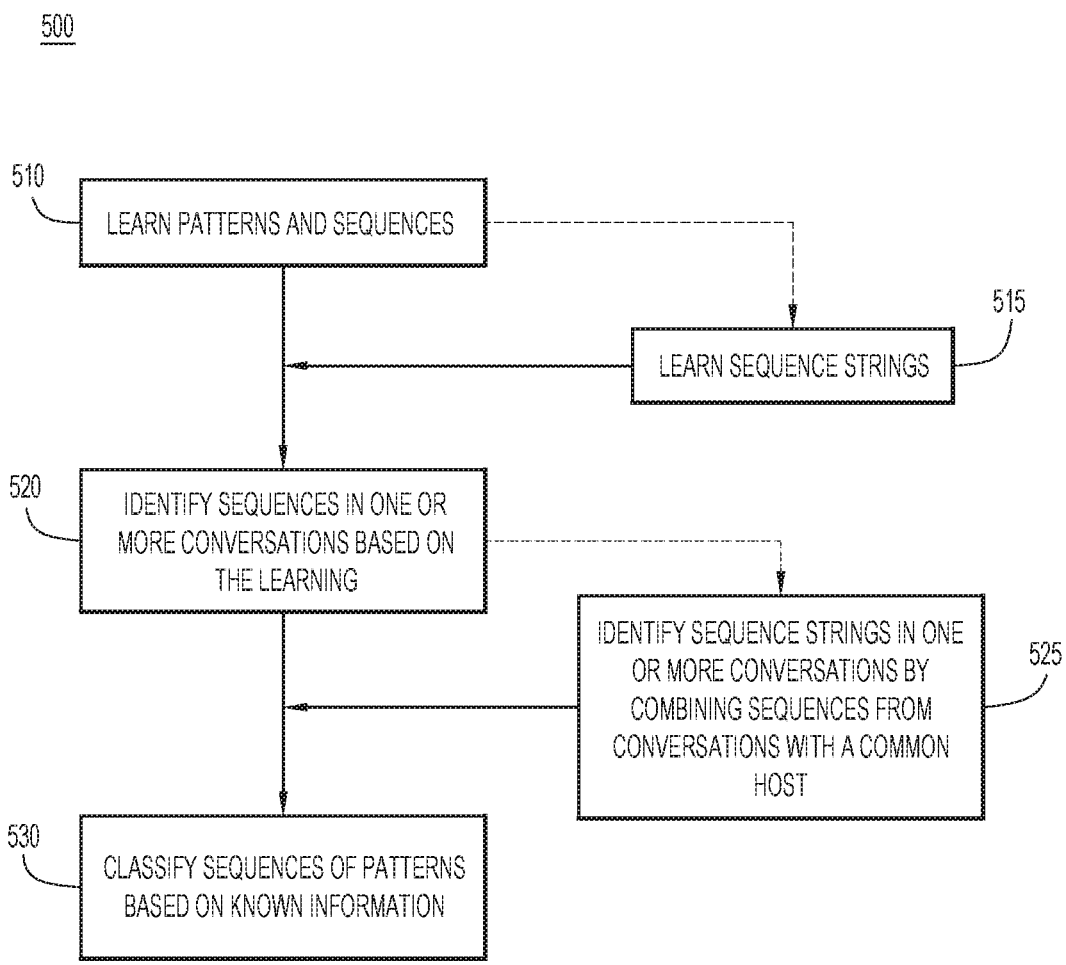
FIG. 5 is a flowchart of a method for identifying anomalous sequences of patterns in sonified features of network traffic, according to an example embodiment.

Now turning to FIG. 5, a flowchart is described of a method 500 for identifying cyber-attacks by identifying anomalous sequences. Reference is also made to FIG. 1 for the purposes of the description of FIG. 5. Initially, at 510, the threat detection logic 160 learns patterns and sequences. At a high-level, this learning includes comparing patterns and sequences within and across conversations. For example, threat detection logic 160 may employ machine learning techniques to identify patterns and sequences in a set of composite waveforms generated based on specific features of conversations between a set of hosts. To expand upon the analogy used above, if identifying patterns in an acoustical waveform is like extracting words from a spoken sentence, then learning sequences is like learning phrases in a sequence of spoken words. In some embodiments, the threat detection logic 160 may also learn ordered strings of sequences (i.e., sequences of sequences over time) at 515. Turning again to the analogy used above, learning strings of sequences may be akin to learning sentences. As was discussed above in connection with FIG. 2, in some embodiments, the selection of features for the feature-specific waveforms may be adjusted based on the learning at 510 and 515.

At 520, sequences are identified in a particular conversation by comparing sequences of patterns in the particular conversation to sequences that have been identified from a previous analysis of other conversations (e.g., during learning at 510). In some embodiments, sequence strings can also be identified by combining sequences from multiple conversations with a common host and comparing sequence strings (i.e., particular orders of sequences in the combined sequences) to known sequence strings (e.g., known orders of sequences).

Sequence identification is described in further detail below in connection with FIG. 6 and sequence string identification is described further detail below in connection with FIG. 7; however, as one example, unsupervised machine learning may be used to identify a sequence of patterns at 520 or an ordered string at 525. For example, the machine learning may determine if sequences or sequence strings are identical or similar to known sequences or sequence strings, respectively. If a sequence or sequence string is identical to a known sequence or known sequence string, the sequence or sequence string may be identified as the known sequence or known sequence string, respectively. Likewise, if a sequence or sequence string is sufficiently similar (e.g., satisfies a similarity threshold, such as 70%, 80%, 90%, or any other manually entered or dynamically determined threshold) to a known sequence or a known sequence string, the sequence or sequence string may be identified as the known sequence or known sequence string, respectively.

Regardless of how sequences are identified, identified sequences can be classified at 530 to identify anomalous and/or malicious sequences. In at least some embodiments, anomalous sequences may be classified as good or bad using a combination of manual tagging and supervised learning. That is, the sequences may be classified based on predetermined or known information. For example, the machine learning may be exposed to simulated cyber-attacks so that particular anomalous sequences can be tagged as specific cyber-attacks Now turning to FIG. 6 for a description of a diagram 600 depicting a conversation 610 is between Host 1 and Host 4. The conversation 610 is representative of a composite acoustical waveform (e.g., waveform 440 from FIG. 4) and includes patterned boxes that are representative of patterns identified in the composite acoustical waveform: patterns 612 (diagonal patterning from a top right corner to a bottom left corner), pattern 614 (diagonal patterning from a top left corner to a bottom right corner), pattern 616 (cross-hatching), and pattern 618 (solid shading). As discussed herein, these patterns may be identified with machine learning techniques that compare portions or segments of the conversation 610 to known portions or segments of composite acoustical waveforms. Once the patterns are identified, the machine learning techniques then compare the sequences of patterns to known sequences. That is, the threat detection logic may employ machine learning techniques to determine if the patterns identified in conversation 610 are appearing in a specific order that is known or unknown.

Figure 6:
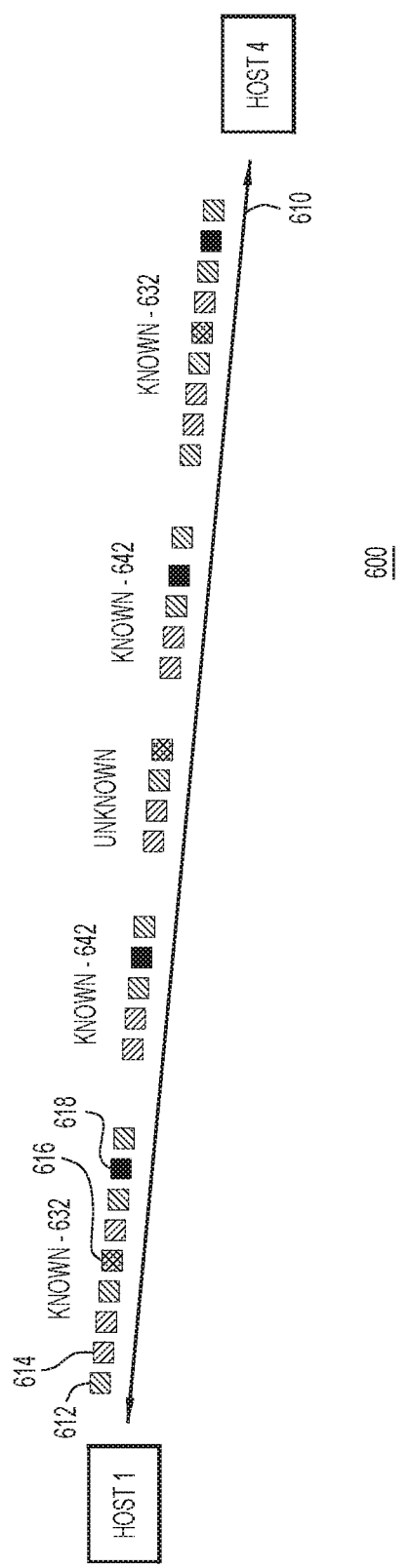
FIG. 6 is a diagram depicting a process for identifying anomalous sequences of patterns in sonified features of network traffic, according to an example embodiment.

In the example provided in FIG. 6, two known sequences—sequence 632 and sequence 642—are each identified twice in conversation 610. Sequence 632 includes the following patterns in the following order: 612-614-614-612-616-614-612-618-612. Sequence 642 includes the following patterns in the following order: 614-614-612-618-612. Each of these sequences are identified because they are identical or substantially similar (e.g., similar enough to satisfy a similarity threshold) to sequences that have been previously identified (e.g., known sequences). By comparison, the sequence found between two instances of sequence 642 (unknown sequence 614-614-612-616) is neither identical nor similar to sequences that have been previously identified. Consequently, this sequence may be marked as an unknown or anomalous sequence. Notably, in some embodiments, patterns themselves may be also be unknown and, in some instances, an unknown pattern may cause a sequence to be categorized as unknown. When a sequence is unknown or anomalous, the sequence may be marked for further analysis, flagged, or compared to known malicious sequences with a lowered similarity threshold. Alternatively, the threat detection logic may be exposed to additional attacks to try to identify the unknown sequence as being associated with a cyber-attack.

Figure 7:
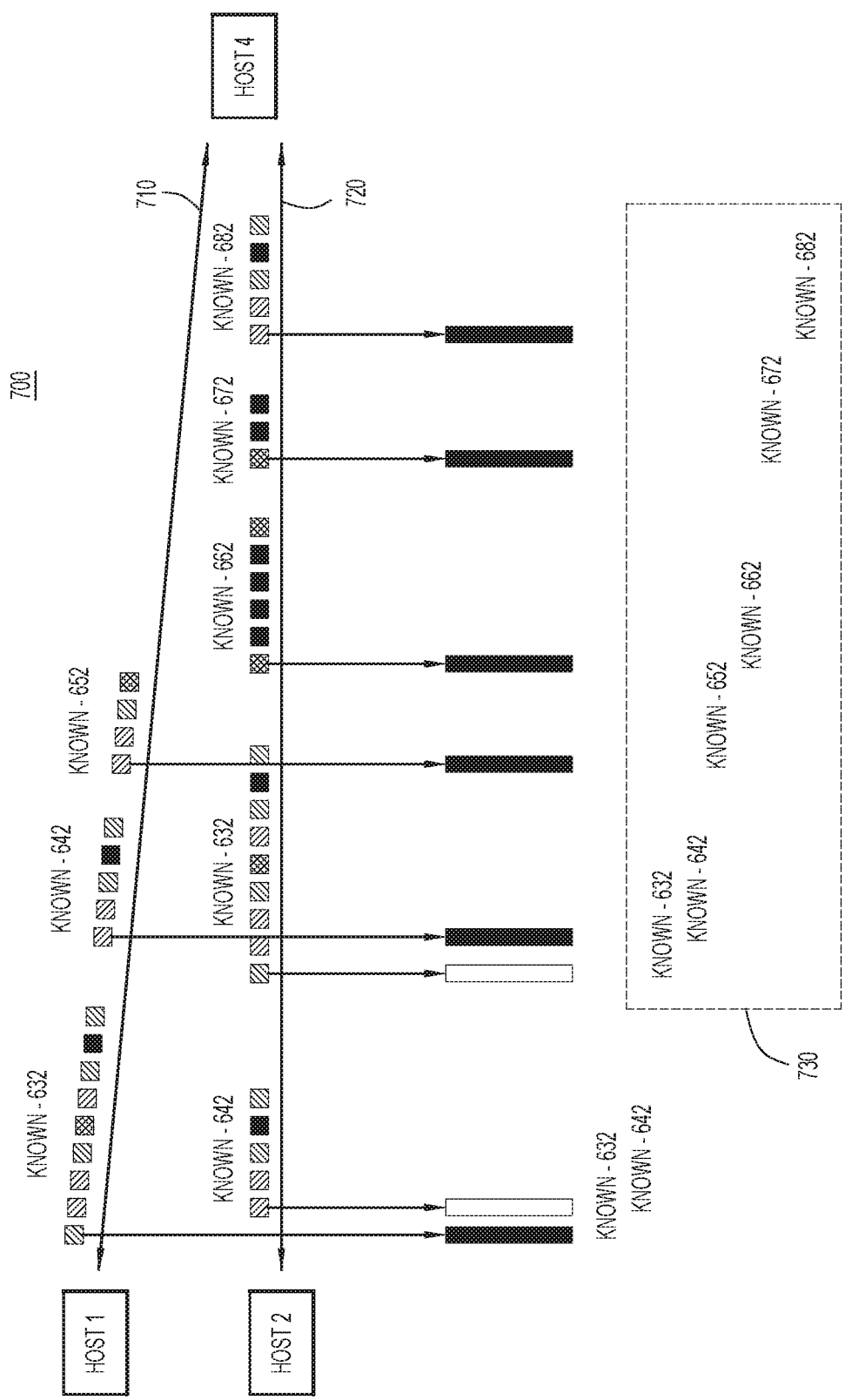
FIG. 7 is a diagram depicting another process of identifying anomalous sequences of patterns in sonified features of network traffic, according to an example embodiment.

Now turning to FIG. 7, in at least some embodiments, sequences from different conversations can be combined into one or more sequence strings when the various conversations have a common host (as mentioned above in connection with 525 of FIG. 5). In FIG. 7, diagram 700 depicts at least some of the sequences from FIG. 6 (e.g., sequence 632 and 642) and also depicts some new sequences that are formed from the patterns identified in FIG. 6 (e.g., patterns 612, pattern 614, pattern 616, and pattern 618). Thus, reference is also made to FIG. 6 for purposes of the description of FIG. 7. That being said, diagram 700 now illustrates two conversations: conversation 710 between Host 1 and Host 4 and conversation 720 between Host 2 and Host 4. Since each of these conversations have Host 4 in common, the sequences identified in these conversations can be combined, over time, into sequence strings, such as sequence string 730, which show the order in which the sequences were initiated, over time.

More specifically, in diagram 700, conversation 710 includes, over time, sequence 632, sequence 642 and sequence 652. By comparison, conversation 720 includes, over time, sequence 642, sequence 632, sequence 662, sequence 672, and sequence 682. As is illustrated in FIG. 7, when these sequences are combined into one or more sequence string, the sequences are combined based on the time at which the sequences started/initiated. Consequently, overall, the sequences associated with Host 4 are combined in the following order: sequence 632-sequence 642-sequence 632-sequence 642-sequence 652-sequence 662-sequence 672-sequence 682. This ordered list of sequences can be analyzed (e.g., with machine learning techniques) to detect an anomaly and/or a malicious attack. For example, when the sequences are each representative of a specific activity, a particular order of sequences may be known to represent of malicious activity.

As a more specific example, consider a scenario where: (1) sequence 632 is representative of an outside or external host (e.g., a host that is external to a particular network) starting a conversation (e.g., exchanging protocols) with an inside or internal host (e.g., a host that is internal to or within a particular network); (2) sequences 642 and 652 are representative of an internal host downloading data from an external host; (3) sequence 662 is representative of an internal host starting a conversation with internal host; and (4) sequences 672 and 682 are representative of an internal host downloading data from an internal host. With these designations, string 730 may be quickly identified as malicious because after Host 4 starts a conversation with an external Host 1 (at 632) and downloads data from an external Host 1 (at 642-652), Host 4 opens a conversation with an internal Host 2 (at 662), and data is transferred between internal Host 4 and internal Host 2 (at 672, 682). Thus, it appears that an external data transfer initiated an internal data transfer, which, based on known information, may be indicative of malware. Consequently, an analysis of the sequence string 730 identified a cyber-attack.

Figure 8:
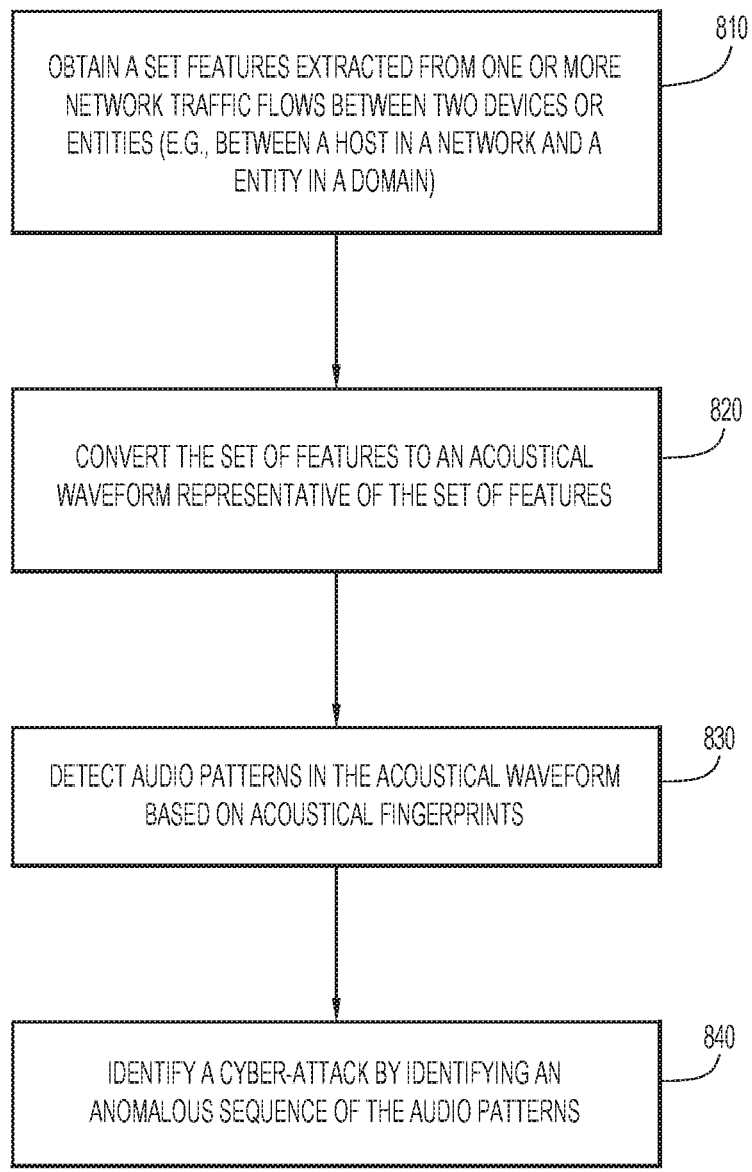
FIG. 8 is a high-level flowchart of a method for detecting cyber-attacks with sonification, according to an example embodiment.

Referring now to FIG. 8, a high-level flowchart is described of a method 800 for identifying cyber-attacks using data sonification. Initially, at 810, a security analysis device obtains a set of features extracted from one or more network traffic flows between a given host in a network and a domain, but more generally, between two devices or entities or processes, regardless of in which network or domain they reside. At 820, the security analysis device converts the set of features to an acoustical waveform representative of the set of features. This is the aforementioned sonification operation. For example, as described above, in some instances, the security analysis device generates a first waveform with a particular frequency and a particular amplitude for a first feature of the set of features when the first feature has a constant value over time and generates a second waveform with a frequency that is modulated over time for a second feature of the set of features when the second feature has a value that changes over time, the frequency being modulated based on changes of the value over time. Then, the security analysis device combines the first waveform with the second waveform to generate the acoustical waveform.

At 830, the security analysis device detects audio patterns in the acoustical waveform based on acoustical fingerprints. As is explained in detail above, in some instances, the security analysis device obtains additional features based on the detecting of the audio patterns. At 840, the security analysis device identifies a cyber-attack in the network by identifying an anomalous sequence of the audio patterns. In some instances, the security analysis device may generate an alert upon detecting the cyber-attack. Additionally or alternatively, the identifying operation may involve comparing various sequences of patterns to predetermined information to identify the anomalous sequence of patterns. Moreover, and as is also explained in detail above, in some instances, the detecting and the identifying performed at 830 and 840 are performed with machine learning techniques.

In some embodiments, the domain is a first domain, the set of features is a first set of features, the acoustical waveform is a first acoustical waveform, the audio patterns are first audio patterns, and the security analysis device obtains a second set of features extracted from one or more network traffic flows between the given host and a second domain. Then, the security analysis device sonifies the second set of features to generate a second acoustical waveform representative of the features of the one or more network traffic flows with respect to the second domain and detects second audio patterns in the second acoustical wave based on acoustical fingerprints. The first patterns and the second patterns are combined into an ordered string and, thus, the identifying (at 840) involves identifying an anomalous sequence of patterns in the ordered string.

Figure 9:
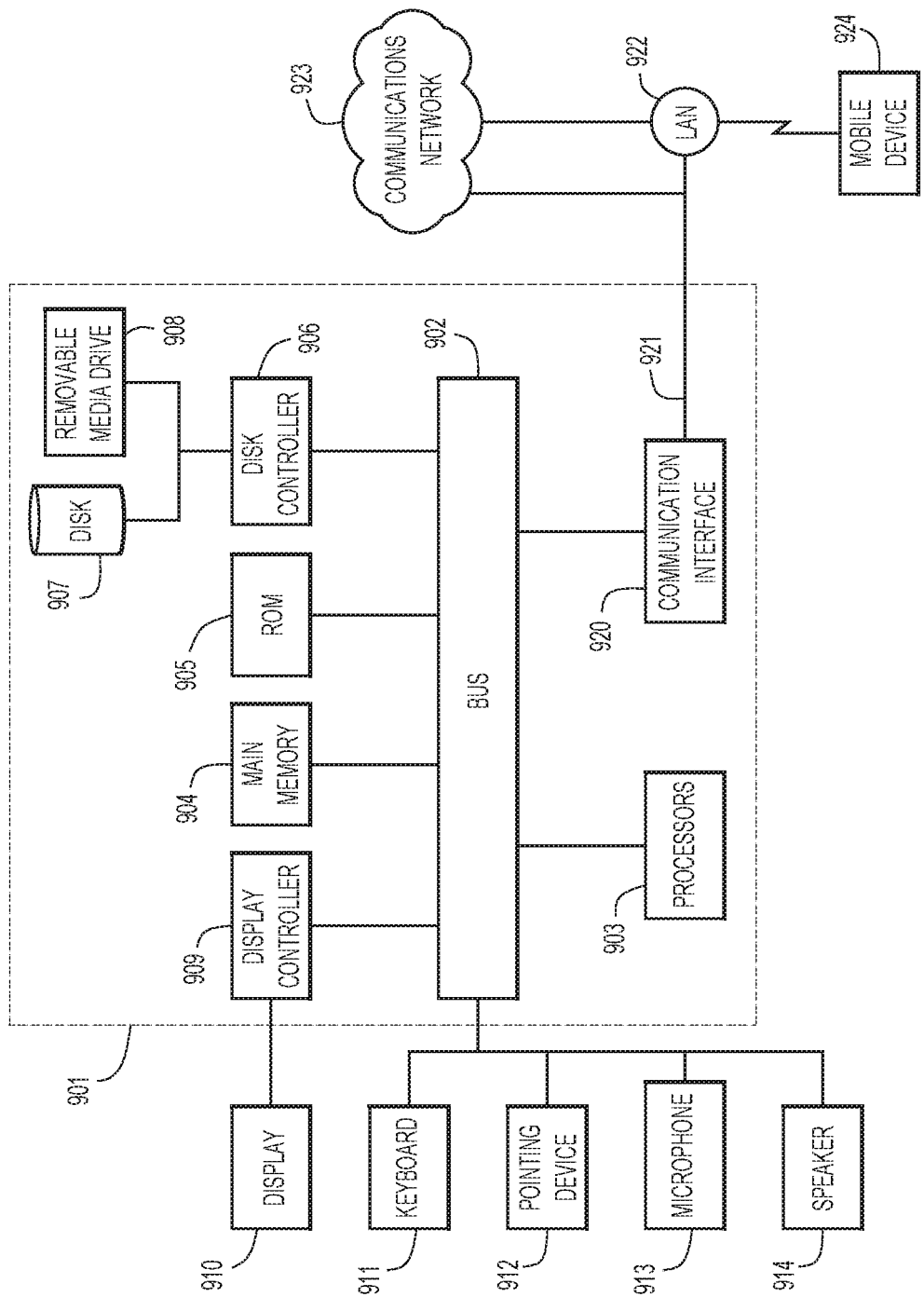
FIG. 9 is a block diagram that illustrates a computer system or apparatus on which the techniques presented herein may be implemented, according to an example embodiment.

FIG. 9 illustrates a block diagram of an apparatus that is configured to operate as a security analysis device or apparatus that hosts threat detection logic 160 according to an example embodiment. The apparatus may be implemented on a computer system 901. The computer system 901 may be programmed to implement a computer based device. The computer system 901 includes a bus 902 or other communication mechanism for communicating information, and a processor 903 coupled with the bus 902 for processing the information. While the figure shows a single block 903 for a processor, it should be understood that the processor 903 represents a plurality of processors or processing cores, each of which can perform separate processing. The computer system 901 may also include a main memory 904, such as a random access memory (RAM) or other dynamic storage device (e.g., dynamic RAM (DRAM), static RAM (SRAM), and synchronous DRAM (SD RAM)), coupled to the bus 902 for storing information and instructions to be executed by processor 903. In addition, the main memory 904 may be used for storing temporary variables or other intermediate information during the execution of instructions by the processor 903. Main memory may also be used to store logic instructions or software for performing the operations shown in FIGS. 2-8.

The computer system 901 may further include a read only memory (ROM) 905 or other static storage device (e.g., programmable ROM (PROM), erasable PROM (EPROM), and electrically erasable PROM (EEPROM)) coupled to the bus 902 for storing static information and instructions for the processor 903.

The computer system 901 may also include a disk controller 906 coupled to the bus 902 to control one or more storage devices for storing information and instructions, such as a magnetic hard disk 907, and a removable media drive 908 (e.g., floppy disk drive, read-only compact disc drive, read/write compact disc drive, compact disc jukebox, tape drive, and removable magneto-optical drive). The storage devices may be added to the computer system 901 using an appropriate device interface (e.g., small computer system interface (SCSI), integrated device electronics (IDE), enhanced-IDE (E-IDE), direct memory access (DMA), or ultra-DMA).

The computer system 901 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 901 may also include a display controller 909 coupled to the bus 902 to control a display 910, such as a liquid crystal display (LCD), light emitting diode (LED) display, etc., for displaying information to a computer user. The computer system 901 may include also include other output devices, such as speaker 914, for example, to output audio. The computer system 901 may include input devices, such as a keyboard 911, a pointing device 912, and a microphone 913 for interacting with a computer user and providing information to the processor 903. The pointing device 912, for example, may be a mouse, a trackball, or a pointing stick for communicating direction information and command selections to the processor 903 and for controlling cursor movement on the display 910. In addition, a printer may provide printed listings of data stored and/or generated by the computer system 901.

The computer system 901 performs a portion or all of the processing operations of the embodiments described herein in response to the processor 903 executing one or more sequences of one or more instructions contained in a memory, such as the main memory 904. Such instructions may be read into the main memory 904 from another computer readable medium, such as a hard disk 907 or a removable media drive 908. One or more processors in a multi-processing arrangement may also be employed to execute the sequences of instructions contained in main memory 904. In alternative embodiments, hard-wired circuitry may be used in place of or in combination with software instructions. Thus, embodiments are not limited to any specific combination of hardware circuitry and software.

As stated above, the computer system 901 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 901, for driving a device or devices for implementing the described embodiments, and for enabling the computer system 901 to interact with a human user. Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 901 also includes a communication interface 920 coupled to the bus 902. The communication interface 920 provides a two-way data communication coupling to a network link 921 that is connected to, for example, a local area network (LAN) 922, or to another communications network 923. For example, the communication interface 920 may be a wired or wireless network interface card or modem (e.g., with SIM card) configured to attach to any packet switched (wired or wireless) LAN or WWAN. As another example, the communication interface 920 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 920 sends and receives electrical, electromagnetic or optical signals that carry digital data streams representing various types of information.

The network link 921 typically provides data communication through one or more networks to other data devices. For example, the network link 921 may provide a connection to another computer through a local area network 922 (e.g., a LAN) or through equipment operated by a service provider, which provides communication services through a communications network 923. The local network 921 and the communications network 923 use, for example, electrical, electromagnetic, or optical signals that carry digital data streams, and the associated physical layer (e.g., CAT 5 cable, coaxial cable, optical fiber, etc.). The signals through the various networks and the signals on the network link 921 and through the communication interface 920, which carry the digital data to and from the computer system 901 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 901 can transmit and receive data, including program code, through the network(s) 922 and 923, the network link 921 and the communication interface 920. Moreover, the network link 921 may provide a connection to a mobile device 924 such as a personal digital assistant (PDA) laptop computer, cellular telephone, or modem and SIM card integrated with a given device.

In summary, in one form, a method is provided comprising: obtaining, at a network security analysis device, a set of features extracted from one or more network traffic flows between a given host in a network and a domain; converting the set of features to an acoustical waveform representative of the set of features; detecting audio patterns in the acoustical waveform using acoustical fingerprints; and identifying a cyber-attack in the network by identifying an anomalous sequence of the audio patterns.

In another form, an apparatus is provided comprising: a network interface configured to enable communications via a network; a processor coupled to the network interface and configured to: obtain a set of features extracted from one or more network traffic flows between a given host in the network and a domain; convert the set of features to an acoustical waveform representative of the set of features; detect audio patterns in the acoustical waveform based on acoustical fingerprints; and identify a cyber-attack in the network by identifying an anomalous sequence of the audio patterns.

In still another form, one or more non-transitory computer readable storage media are provided encoded with software comprising computer executable instructions and when the software is executed operable to: obtain a set of features extracted from one or more network traffic flows from between given host in a network and a domain; convert the set of features to an acoustical waveform representative of the set of features; detect audio patterns in the acoustical waveform using acoustical fingerprints; and identify a cyber-attack in the network by identifying an anomalous sequence of the audio patterns.

The above description is intended by way of example only. Various modifications and structural changes may be made therein without departing from the scope of the concepts described herein and within the scope and range of equivalents of the claims.

What is claimed is:

1. A method comprising:
obtaining, at a network security analysis device, a set of features extracted from one or more network traffic flows between a given host in a network and a domain;
converting the set of features to an acoustical waveform representative of the set of features;
detecting audio patterns in the acoustical waveform using acoustical fingerprints; and
identifying a cyber-attack in the network by identifying an anomalous sequence of the audio patterns.

2. The method of claim 1, further comprising:
generating an alert upon detection of the cyber-attack.

3. The method of claim 1, wherein the converting further comprises:
generating a first waveform with a particular frequency and a particular amplitude for a first feature of the set of features when the first feature has a constant value over time;
generating a second waveform with a frequency that is modulated over time for a second feature of the set of features when the second feature has a value that changes over time, the frequency being modulated based on changes of the value over time; and
combining the first waveform with the second waveform to generate the acoustical waveform.

4. The method of claim 1, further comprising:
obtaining additional features based on the detecting of the audio patterns.

5. The method of claim 1, wherein the detecting and the identifying are performed with machine learning techniques.

6. The method of claim 1, wherein the domain is a first domain, the set of features is a first set of features, the acoustical waveform is a first acoustical waveform, the audio patterns are first audio patterns, and the method further comprises:
obtaining a second set of features extracted from one or more network traffic from the given host to a second domain;
converting the second set of features to a second acoustical waveform representative of the features of the one or more network traffic flows with respect to the second domain;
detecting second audio patterns in the second acoustical wave using acoustical fingerprints; and
combining the first audio patterns and the second audio patterns into an ordered string; and
wherein the identifying comprises identifying an anomalous sequence of the audio patterns in the ordered string.

7. The method of claim 1, wherein the identifying further comprises:
comparing various sequences of patterns to predetermined information to identify the anomalous sequence of the audio patterns.

8. An apparatus comprising:
a network interface configured to enable communications via a network;
a processor coupled to the network interface and configured to:
obtain a set of features extracted from one or more network traffic flows between a given host in the network and a domain;
convert the set of features to an acoustical waveform representative of the set of features;
detect audio patterns in the acoustical waveform based on acoustical fingerprints; and
identify a cyber-attack in the network by identifying an anomalous sequence of the audio patterns.

9. The apparatus of claim 8, wherein the processor is further configured to:
generate an alert upon detection of the cyber-attack.

10. The apparatus of claim 8, wherein the processor is configured to convert by:
generating a first waveform with a particular frequency and a particular amplitude for a first feature of the set of features when the first feature has a constant value over time;
generating a second waveform with a frequency that is modulated over time for a second feature of the set of features when the second feature has a value that changes over time, the frequency being modulated based on changes of the value over time; and
combining the first waveform with the second waveform to generate the acoustical waveform.

11. The apparatus of claim 8, wherein the processor is further configured to:
obtain additional features based on the detecting of the audio patterns.

12. The apparatus of claim 8, wherein the processor is configured to perform the detect and the identify operations using machine learning techniques.

13. The apparatus of claim 8, wherein the domain is a first domain, the set of features is a first set of features, the acoustical waveform is a first acoustical wave, the audio patterns are first audio patterns, and the processor is further configured to:
obtain a second set of features extracted from one or more network traffic flows from between the given host and a second domain;
convert the second set of features to a second acoustical waveform representative of the features of the one or more network traffic flows with respect to the second domain;
detect second audio patterns in the second acoustical waveform based on acoustical fingerprints;
combine the first audio patterns and the second audio patterns into an ordered string; and
identify an anomalous sequence of the audio patterns in the ordered string.

14. The apparatus of claim 8, wherein the processor is configured to identify by:

comparing various sequences of patterns to predetermined information to identify the anomalous sequence of the audio patterns.

15. One or more non-transitory computer readable storage media encoded with software comprising computer executable instructions and when the software is executed operable to:
obtain a set of features extracted from one or more network traffic flows from between given host in a network and a domain;
convert the set of features to an acoustical waveform representative of the set of features;
detect audio patterns in the acoustical waveform using acoustical fingerprints; and
identify a cyber-attack in the network by identifying an anomalous sequence of the audio patterns.

16. The non-transitory computer readable storage media of claim 15, further comprising instructions operable to:
generate an alert upon detection of the cyber-attack.

17. The non-transitory computer readable storage media of claim 15, wherein the instructions operable to convert further comprise instructions operable to:
generate a first waveform with a particular frequency and a particular amplitude for a first feature of the set of features when the first feature has a constant value over time;
generate a second waveform with a frequency that is modulated over time for a second feature of the set of features when the second feature has a value that changes over time, the frequency being modulated based on changes of the value over time; and
combine the first waveform with the second waveform to generate the acoustical waveform.

18. The non-transitory computer readable storage media of claim 15, further comprising instructions operable to:
obtain additional features based on detecting of the audio patterns.

19. The non-transitory computer readable storage media of claim 15, wherein the domain is a first domain, the set of features is a first set of features, the acoustical waveform is a first acoustical waveform, the audio patterns are first audio patterns, and the instructions further comprising instructions operable to:
obtain a second set of features extracted from one or more network traffic flows between the given host and a second domain;
convert the second set of features to a second acoustical waveform representative of the features of the one or more network traffic flows to the second domain;
detect second audio patterns in the second acoustical waveform based on acoustical fingerprints;
combine the first audio patterns and the second audio patterns into an ordered string; and
identify an anomalous sequence of the audio patterns in the ordered string.

20. The non-transitory computer readable storage media of claim 15, wherein the instructions operable to identify further comprise instructions operable to:
compare various sequences of patterns to predetermined information to identify the anomalous sequence of the audio patterns.

* * * * *